United States Patent
Stemmer et al.

(10) Patent No.: US 6,520,571 B2
(45) Date of Patent: Feb. 18, 2003

(54) MULTI-PART HOLLOW CHAMBER SEAL FOR SEALING A COVER RELATIVE TO A MOTOR VEHICLE ROOF OPENING

(75) Inventors: Thomas Stemmer, München (DE); Dirk Auerswald, Penzberg (DE); Keith Bishop, Birmingham (GB); Symon Lewis, Lichfield (GB)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/738,887

(22) Filed: Dec. 18, 2000

(65) Prior Publication Data

US 2002/0003358 A1 Jan. 10, 2002

(30) Foreign Application Priority Data

Dec. 17, 1999 (DE) ..................................... 299 23 157 U

(51) Int. Cl.$^7$ ................................................ B60J 10/10
(52) U.S. Cl. ........................... 296/216.06; 296/216.09; 49/479.1; 49/482.1; 49/484.1
(58) Field of Search ....................... 296/216.09, 216.06, 296/216.07; 49/479.1, 482.1, 484.1

(56) References Cited

U.S. PATENT DOCUMENTS

| | | | | |
|---|---|---|---|---|
| 1,335,920 A | * | 4/1920 | Rockett | 49/479.1 |
| 2,033,436 A | * | 3/1936 | McCormick | 49/479.1 |
| 4,783,116 A | * | 11/1988 | Hough | 296/218 X |
| 5,524,955 A | * | 6/1996 | Brocke et al. | 49/482.1 X |
| 5,692,340 A | * | 12/1997 | Jinma et al. | 49/479.1 |

FOREIGN PATENT DOCUMENTS

DE 39 40 013 5/1991

* cited by examiner

*Primary Examiner*—Dennis H. Pedder
(74) *Attorney, Agent, or Firm*—Nixon Peabody LLP; David S. Safran

(57) ABSTRACT

A multi-part hollow chamber seal for sealing a rectangular cover (10) relative to the edge of a rectangular motor vehicle roof opening with a connecting part for connecting a sealing part (14) which runs around a curved corner to a sealing part (13) which adjoins it via a seam, in the form of a connecting tube (21) which penetrates the seam and which is inserted into the hollow chambers (19, 20) of the two sealing parts (13, 14). The connecting tube (21) extends along the entire bend of the sealing part (14) which runs around the corner.

7 Claims, 1 Drawing Sheet

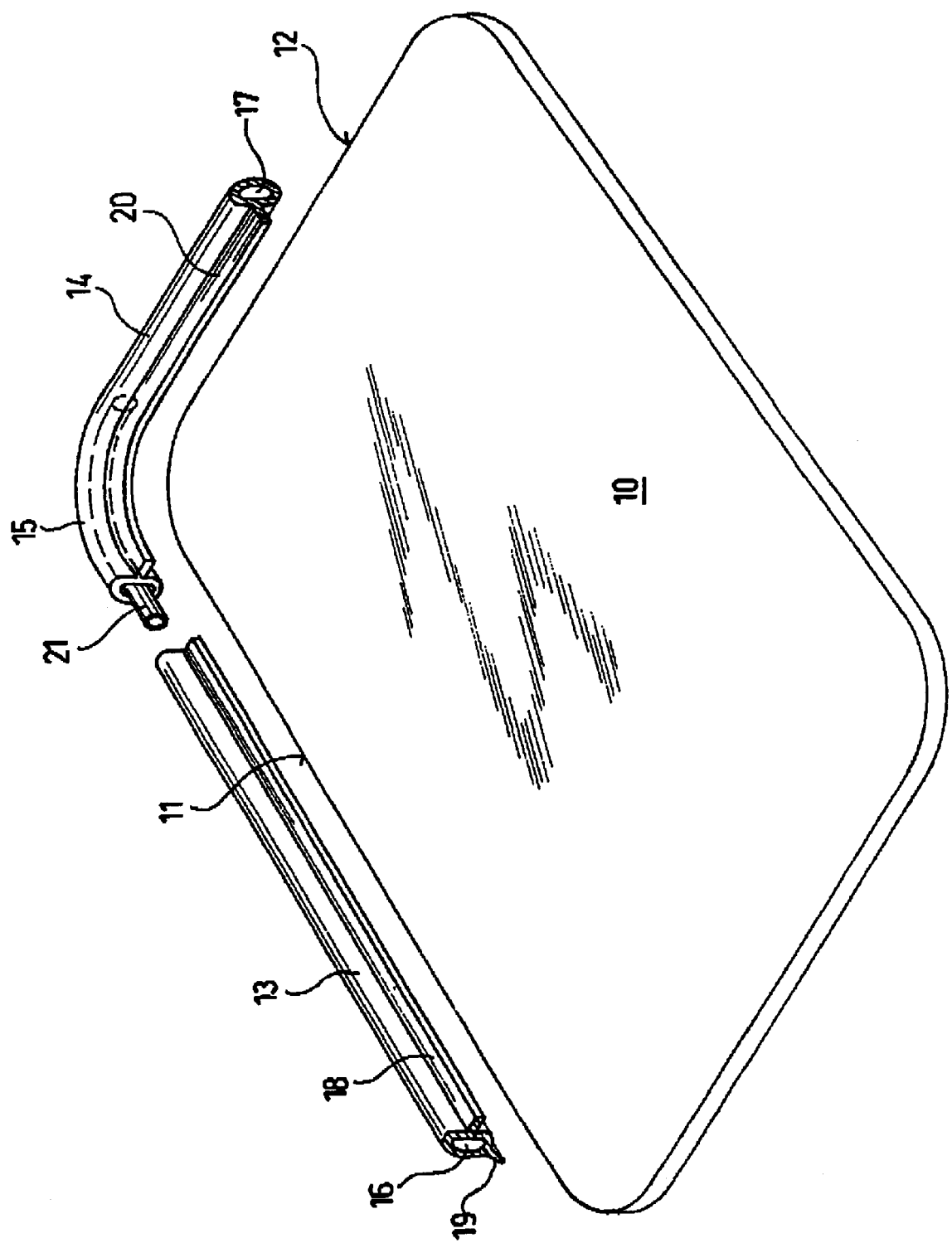

MULTI-PART HOLLOW CHAMBER SEAL FOR SEALING A COVER RELATIVE TO A MOTOR VEHICLE ROOF OPENING

BACKGROUND OF THE INVENTION

1. Field of the Invention

The invention relates to a multi-part, hollow chamber seal for sealing a rectangular cover relative to the edge of a rectangular motor vehicle roof opening with a connecting part for connecting a sealing part which runs around a corner to a sealing part, which adjoins it via a seam, the connecting part being in the form of a connecting tube which penetrates the seam and which is inserted into the hollow chambers of the two sealing parts.

2. Description of Related Art

A hollow chamber seal of the initially mentioned type is known from German Patent DE 39 40 013 C2 and is formed of two U-shaped sealing parts of identical profile with seams in the area of the narrow sides of the rectangular hollow chamber seal, an adhesive tube piece being used as the connection part for joining the two sealing parts. This adhesive tube piece is made short and ends within each sealing part at a short distance from the respective seam. In particular, the respective connecting site is located adjoining the rounded corner area of the sealing part in a section which runs in a straight line. The short adhesive tube piece performs its function as a connecting part within the sealing part ends which abut one another. However, the disadvantage in this known hollow chamber seal is that it is not suited for reliably preventing airstream noise in the curved corner areas in which the seal runs. This is especially the case because the seal, at these critical sites, is exposed to a strong wind load which presses in the hollow sealing bodies, and thus, causes airstream noise. In addition, the hollow chamber seals on this critical end area can be permanently deformed during installation because the hollow chamber wall is not very resistant to the forces acting on it. This also leads to unwanted airstream noise at the indicated critical sites of the hollow chamber seal between the closed cover and the motor vehicle roof opening.

SUMMARY OF THE INVENTION

In view of this prior art, the object of the invention is to devise a hollow chamber seal of the initially mentioned type which also performs a reliable sealing function at the critical corner areas, and especially prevents the formation of airstream noise.

This object is achieved by the feature that the connecting tube extends around the entire bend of the sealing part which runs around the corner of the roof opening.

According to the invention, the connecting tube is placed in the critical bending section of the multi-part hollow chamber seal and extends around the entire bend so that the hollow chamber seal is supported by the connecting tube which is located in its hollow chamber in the entire bending area. This controlled stiffening of the hollow chamber seal in the corner area, on the one hand, prevents the hollow chamber seal from being attached during installation in permanently pinched form there, while on the other hand, the stiffening of the hollow chamber of the seal ensures that the wind load cannot press in the seal there. Airstream noise is thus effectively eliminated in the critical corner area of the hollow chamber seal.

The seam penetrated by the connecting tube between the bordering hollow chamber seal parts is located preferably on the straight front part of the seal, i.e., in the area of the front edge of the cover for closing the motor vehicle roof opening. This further contributes to the elimination of airstream noise.

In order to permanently ensure the sealing function in the area of the seam, the corresponding sealing parts are cemented to one another on the seam. Alternatively or in addition thereto, the connecting tube can be cemented in the area of the seam to the inside walls of the two bordering sealing parts.

The connecting tube is preferably a rubber tube with elasticity which is chosen such that the hollow chamber seal has the desired elasticity and strength in the corner area.

In the following, the invention is explained using the drawings which show a preferred embodiment of the invention by way of example.

BRIEF DESCRIPTION OF THE DRAWINGS

The sole FIGURE of the drawings schematically shows, in an exploded view, one embodiment of the multi-part hollow chamber seal for sealing a rectangular cover relative to the edge of a correspondingly rectangular motor vehicle opening which is not shown in the FIGURE.

DETAILED DESCRIPTION OF THE INVENTION

The hollow chamber seal is shown simply in the area of the front edge 11 of the cover 10 and in the area of one side edge 12 of the cover 10.

The hollow chamber seal comprises a front sealing part 13 which extends over its entire length in a straight line and runs parallel to the front edge 11 of the cover 10, and a side sealing part 14 which extends in a straight line parallel to the side edge 12 of the cover 10 and has a bent section 15 with which this sealing part 14 runs around the corner between the side edge 12 and the front edge 11 of the cover 10.

The two sealing parts 13, 14 each have a hollow chamber 16 and 17. The front sealing part 13 has two lips, one lip 18 pointing towards the cover and one lip 19 pointing outwardly to adjoin the fixed roof skin on the edge of the motor vehicle roof opening. The sealing part 14 has only one single sealing lip 20, which points towards the cover 10.

The two sealing parts 13, 14 which are shown separately from one another in the FIGURE are designed to be connected to one another with the formation of a seam using a connecting part in the form of a rubber tube 21. The outside diameter of this rubber tube 21 corresponds roughly to the inside diameter of the hollow chambers 16 and 17 of the two sealing parts 13, 14. The rubber tube 21 has a shorter section which projects from the bent section 15 of the sealing part 14 and is designed to fit into the hollow chamber 16 of the front sealing part 13. This connection of the two sealing parts 13, 14, which is effected using the rubber tube 21, is permanently secured by cementing. For example, the sealing parts 13, 14 can be cemented at their annular end faces, and optionally, the outer surface of the rubber tube 21 can be cemented alternatively or additionally to the inside walls of the two sealing parts 13, 14.

According to another important aspect of this invention the rubber tube runs through the entire bent section 15 of the sealing part 14 in order to support this section, and thus, to stiffen it in a suitable manner.

For example, the rubber tube typically has a total length of 90 mm, 80 mm of the rubber tube 21 running within the bent section 15 of the side sealing part 14, while only 10 mm of the rubber tube fits into the front sealing part 13.

Apart from the manner of connection of the sealing parts 13, 14, the seal can otherwise be the same as in the above-mentioned German patent and the roof construction as a whole, itself is otherwise conventional.

What is claimed is:

1. Multi-part hollow chamber seal for sealing a rectangular cover relative to a edge of a rectangular motor vehicle roof opening comprising: a first sealing part having a hollow chamber and which runs around a curved corner, the first sealing part having a sealing lip; a second sealing part which has a hollow chamber which extends in a straight line parallel to the cover and which adjoins the first sealing part with a seam therebetween, the second sealing part having a pair of sealing lips; and a connecting part in the form of a connecting tube which penetrates the seam and which is inserted into the hollow chambers of the first and second sealing parts for connecting the first and second sealing parts together, wherein the connecting tube extends through the entire bend of the sealing part which runs around the corner, wherein the seam is located on a straight front part of the seal.

2. Hollow chamber seal as claimed in claim 1, wherein the first and second sealing parts are cemented to one another at the seam.

3. Hollow chamber seal as claimed in claim 2, wherein the connecting tube is cemented to inside walls of the sealing parts at least in the area of the seam.

4. Hollow chamber seal as claimed in claim 3, wherein the connecting tube is a rubber tube.

5. Hollow chamber seal as claimed in claim 1, wherein the connecting tube is cemented to inside walls of the sealing parts at least in the area of the seam.

6. Hollow chamber seal as claimed in claim 1, wherein the connecting tube is a rubber tube.

7. Hollow chamber seal as claimed in claim 1, wherein the sealing lip of the first sealing part points towards the cover, a first one of the pair of sealing lips of the second sealing part points towards the cover, and a second one of the pair of sealing lips of the second sealing part points outwardly to adjoin a fixed roof skin on the edge of the motor vehicle roof opening.

* * * * *